US009587587B2

(12) United States Patent
Foege et al.

(10) Patent No.: US 9,587,587 B2
(45) Date of Patent: Mar. 7, 2017

(54) PRESSURE REDUCING DEVICE FOR GASEOUS FUEL SYSTEM

(71) Applicant: Electro-Motive Diesel, Inc., LaGrange, IL (US)

(72) Inventors: Aaron Gamache Foege, Westmont, IL (US); Emma Kathleen Kaiser, La Grange Park, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 295 days.

(21) Appl. No.: 14/260,765

(22) Filed: Apr. 24, 2014

(65) Prior Publication Data

US 2015/0308385 A1 Oct. 29, 2015

(51) Int. Cl.
| | |
|---|---|
| *F02M 21/02* | (2006.01) |
| *F15C 3/00* | (2006.01) |
| *F15D 1/00* | (2006.01) |
| *F15C 1/18* | (2006.01) |
| *F15C 1/08* | (2006.01) |
| *F15D 1/02* | (2006.01) |
| *F15D 1/14* | (2006.01) |

(52) U.S. Cl.
CPC .... *F02M 21/0239* (2013.01); *F02M 21/0242* (2013.01); *F15C 1/08* (2013.01); *F15C 1/18* (2013.01); *F15C 3/005* (2013.01); *F15D 1/006* (2013.01); *F15D 1/02* (2013.01); *F15D 1/025* (2013.01); *F15D 1/14* (2013.01); *Y02T 10/32* (2013.01)

(58) Field of Classification Search
CPC ............. F02M 21/023; F02M 21/0233; F02M 21/0236; F02M 21/0239; F02M 21/0242; F02M 21/0245; F15D 1/006; F15D 1/007; F15D 1/02; F15D 1/025; F15C 1/08; F15C 1/18; F15C 3/00; F15C 3/005
USPC ....... 123/375, 390, 457, 506, 511, 525, 526, 123/527, 528, 529; 137/829; 138/40, 42, 138/43, 44, 45, 46
See application file for complete search history.

(56) References Cited

U.S. PATENT DOCUMENTS

| | | | | |
|---|---|---|---|---|
| 1,790,854 | A * | 2/1931 | Defrance | F02M 1/00 123/590 |
| 1,866,829 | A * | 7/1932 | Welling | F02M 1/00 123/590 |
| 2,580,228 | A * | 12/1951 | Johnson | G01M 9/04 138/45 |
| 3,393,984 | A * | 7/1968 | Wisman | F02M 33/046 123/590 |

(Continued)

FOREIGN PATENT DOCUMENTS

EP 232478 A2 * 8/1987 ............. B65D 90/32

*Primary Examiner* — Stephen K Cronin
*Assistant Examiner* — Kevin R Steckbauer
(74) *Attorney, Agent, or Firm* — Finnegan, Henderson, Farabow, Garrett & Dunner, LLP

(57) ABSTRACT

A pressure reducing device is disclosed for use with a gaseous fuel system. The pressure reducing device may include a body defining an inlet and an outlet, and a converging-diverging nozzle formed between the inlet and the outlet. The pressure reducing device may further include a shockwave inducing element disposed within the body between the venture and the outlet, and an airfoil located inside the body upstream of the shockwave inducing element and connected to move the shockwave inducing element.

18 Claims, 2 Drawing Sheets

(56) References Cited

U.S. PATENT DOCUMENTS

| | | | | |
|---|---|---|---|---|
| 3,777,727 A | * | 12/1973 | Kirchner | F02M 69/20 123/179.16 |
| 3,880,125 A | * | 4/1975 | Kammerer | F02D 41/182 123/494 |
| 4,058,100 A | * | 11/1977 | Tanaka | F02M 69/00 123/457 |
| 4,064,843 A | * | 12/1977 | Holzbaur | F02M 69/043 123/455 |
| 4,064,847 A | * | 12/1977 | Holzbaur | F02M 69/04 123/455 |
| 4,108,128 A | * | 8/1978 | Knapp | F02M 69/22 123/452 |
| 4,197,824 A | | 4/1980 | Holzbaur | |
| 4,243,003 A | * | 1/1981 | Knapp | F02M 69/047 123/442 |
| 4,326,452 A | * | 4/1982 | Nawa | F15D 1/08 137/829 |
| 4,381,017 A | * | 4/1983 | Bissinger | B64D 33/02 137/15.1 |
| 4,413,598 A | * | 11/1983 | Tsutsumi | F02B 31/06 123/306 |
| 4,425,897 A | * | 1/1984 | Irvoas | F02D 19/022 123/27 GE |
| 4,465,034 A | * | 8/1984 | Tsutsumi | F02B 31/06 123/184.21 |
| 4,697,607 A | * | 10/1987 | Aalto | F24F 11/047 137/1 |
| 5,154,050 A | | 10/1992 | Herup et al. | |
| 5,373,824 A | * | 12/1994 | Peters | F02D 19/022 123/456 |
| 5,802,011 A | * | 9/1998 | Winters | F15D 1/02 367/83 |
| 6,152,158 A | * | 11/2000 | Hu | F16K 47/04 137/14 |
| 6,227,185 B1 | * | 5/2001 | Spracher | F02B 31/04 123/590 |
| 6,302,142 B1 | * | 10/2001 | Behrens | F15D 1/02 137/338 |
| 6,591,667 B1 | * | 7/2003 | Kotwicki | F02D 11/107 73/114.33 |
| 6,708,905 B2 | | 3/2004 | Borissov et al. | |
| 6,776,825 B2 | | 8/2004 | Betting et al. | |
| 7,451,942 B2 | | 11/2008 | Borissov | |
| 9,279,334 B2 | * | 3/2016 | Lawlor | F02C 3/00 |
| 2002/0043249 A1 | * | 4/2002 | Lee et al. | F02M 55/025 123/456 |
| 2013/0199154 A1 | * | 8/2013 | Grossi | F02K 1/36 60/204 |

* cited by examiner

PRESSURE REDUCING DEVICE FOR GASEOUS FUEL SYSTEM

TECHNICAL FIELD

The present disclosure relates generally to a pressure reducing device and, more particularly, to a pressure reducing device for a gaseous fuel system.

BACKGROUND

Gaseous fuel powered engines are common in locomotive applications. For example, the engines of a locomotive can be powered by natural gas alone or by a mixture of natural gas and diesel fuel. As demands for reduced emissions and increased efficiency grow, the gaseous fuel is delivered to the engine at higher and higher pressures. And in order to properly control performance of a gaseous fueled engine, the pressure of the gaseous fuel delivered into the engine should be tightly regulated.

Historically, the pressure of the gaseous fuel being delivered into an engine has been controlled by way of a pressure regulator and/or a gas vent valve. Most conventional pressure regulators and vent valves function by selectively restricting the flow of gaseous fuel across a variable orifice. While adequate in some stationary applications, conventional regulators and vent valves may not be suitable for transportation applications because of extreme conditions (e.g., vibration and shock loading) experienced in these applications. In addition, creating a pressure drop across an orifice can cause a reduction in temperature of the gas. And if unaccounted for, the reduction in temperature can be significant enough to cause material compatibility problems (e.g., brittleness) that results in cracking or failure.

The disclosed pressure reducing device is directed to overcoming one or more of the problems set forth above and/or other problems of the prior art.

SUMMARY

In one aspect, the present disclosure is directed to a pressure reducing device. The pressure reducing device may include a body defining an inlet and an outlet, and a converging-diverging nozzle formed between the inlet and the outlet, The pressure reducing device may also include a shockwave inducing element disposed within the body between the converging-diverging nozzle and the outlet, and an airfoil located inside the body upstream of the shockwave inducing element and connected to move the shockwave inducing element.

In another aspect, the present disclosure is directed to a fuel system for an engine. The fuel system may include a supply of liquid fuel, a pump configured to draw fuel from the supply, and an accumulator located downstream of the pump and configured to store gasified fuel. The fuel system may also include a pressure reducing device fluidly connected to the accumulator. The pressure reducing device may have a body defining an inlet and an outlet, a converging-diverging nozzle formed between the inlet and the outlet, and a ramp disposed within the body between the converging-diverging nozzle and the outlet. The ramp may have a first end pivotally connected to a wall of the body, and a second end. The pressure reducing device may also include an airfoil located inside the body upstream of the ramp, linkage connecting the airfoil to the second end of the ramp, and a spring biasing the airfoil and the ramp toward the wall of the body.

In yet another aspect, the present disclosure is directed to a method of regulating gaseous fuel. The method may include directing gaseous fuel through a converging-diverging nozzle. The method may also include generating an oblique shockwave in the gaseous fuel at a location downstream of the converging-diverging nozzle to cause a pressure drop in the gaseous fuel.

DETAILED DESCRIPTION

Figure 1:
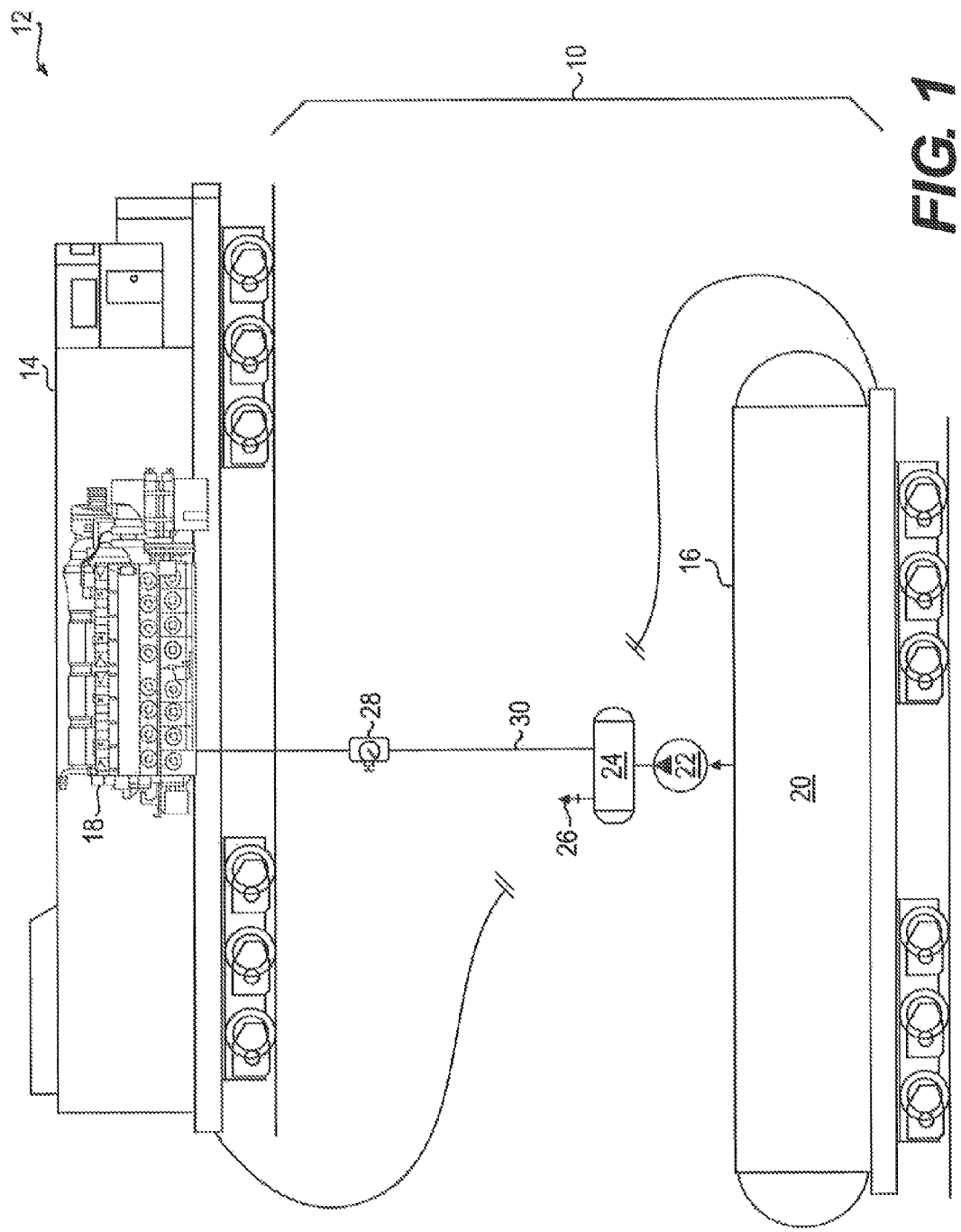
FIG. 1 is a diagrammatic illustration of an exemplary disclosed fuel system.

FIG. 1 illustrates an exemplary fuel system 10. In the embodiment shown in FIG. 1, fuel system 10 is associated with a mobile application, specifically a train consist 12. Train consist 12 may have one or more locomotives 14 and a tender car 16. Locomotive 14 may be coupled to tow tender car 16, and tender car 16 may be configured to provide one or more engines 18 of locomotive 14 with fuel via fuel system 10. It should be noted, however, that fuel system 10 could be associated with other mobile or stationary applications, as desired.

Fuel system 10 may include multiple components that cooperate to provide a gasified fuel (e.g., natural gas) to engine(s) 18 in a regulated manner. These components may include, among other things, a tank 20 of liquid fuel, a pump 22 configured to draw fuel from tank 20, a high-pressure accumulator 24 configured to hold a supply of gaseous fuel, and one or more pressure reducing devices fluidly connected to the accumulator 24. In the disclosed embodiment, two pressure reducing devices are shown, including a vent 26 and a regulator 28. Vent 26 may be located to selectively vent accumulator 24 to the atmosphere, while regulator 28 may be disposed within a supply line 30 that connects accumulator 24 to engine(s) 18. Regulator 28 may be configured to regulate a pressure of the gaseous fuel supply directed to engine(s) 18.

Tank 20 may embody a cryogenic tank configured to hold the natural gas in a liquefied state. In the exemplary embodiment, tank 20 is an insulated tank that maintains a temperature of the natural gas below a boiling temperature of about −165° C. It is contemplated that tank 20 may be provided with conventional equipment for handling liquefied natural gas (LNG), for example chillers, circulators, heaters, ventilators, etc., as desired.

Pump 22 may be any type of pump known in the art for handling natural gas in its liquid state (LNG) and/or gaseous state. In particular, at any point between tank 20 and accumulator 24 (e.g., upstream and/or downstream of pump 22), the LNG may gasify. In the disclosed exemplary embodiment, the LNG is gasified downstream of pump 22 and pump 22 is configured to handle only LNG. In this embodiment, pump 22 includes a fixed displacement pumping device (e.g., a piston, diaphragm or rotor pump) that is powered by a variable speed drive. With this configuration, although the displacement of 22 may be fixed, the output of pump 22 may still be varied by adjusting the speed of the drive. It is contemplated that other types of pumps may alternatively be utilized to push natural gas through supply line 30, if desired, for example a variable displacement pump.

Accumulator 24 may embody a high-pressure vessel configured to store pressurized natural gas for future use by engine(s) 18. As a pressure of the natural gas from pump 22 exceeds a pressure of accumulator 24, the natural gas may flow into accumulator 24. Because the natural gas therein is compressible, it may act like a spring and compress as more natural gas flows in. When the pressure of the natural gas in supply line 30 drops below the pressure of accumulator 24, the compressed natural gas may expand and exit accumulator 24. It is contemplated that accumulator 24 may alternatively embody a membrane/spring-biased or bladder type of accumulator, if desired.

Vent 26 and regulator 28, while used for different purposes, may function in a similar way. Specifically, vent 26 may be configured to selectively allow gaseous fuel to discharge from accumulator 24 to the atmosphere in a controlled manner (i.e., at a control pressure and temperature) that does not compromise the integrity of vent 26. Regulator 28 may similarly allow gaseous fuel to discharge from accumulator 24 in a controlled manner. In contrast to vent 26, however, regulator 28 may direct the discharging gaseous fuel to engine(s) 18 via supply line 30. It is contemplated that vent 26 and regulator 28 may control the gaseous fuel to discharge at the same rates and pressures or at different rates and pressures, as desired.

Figure 2:
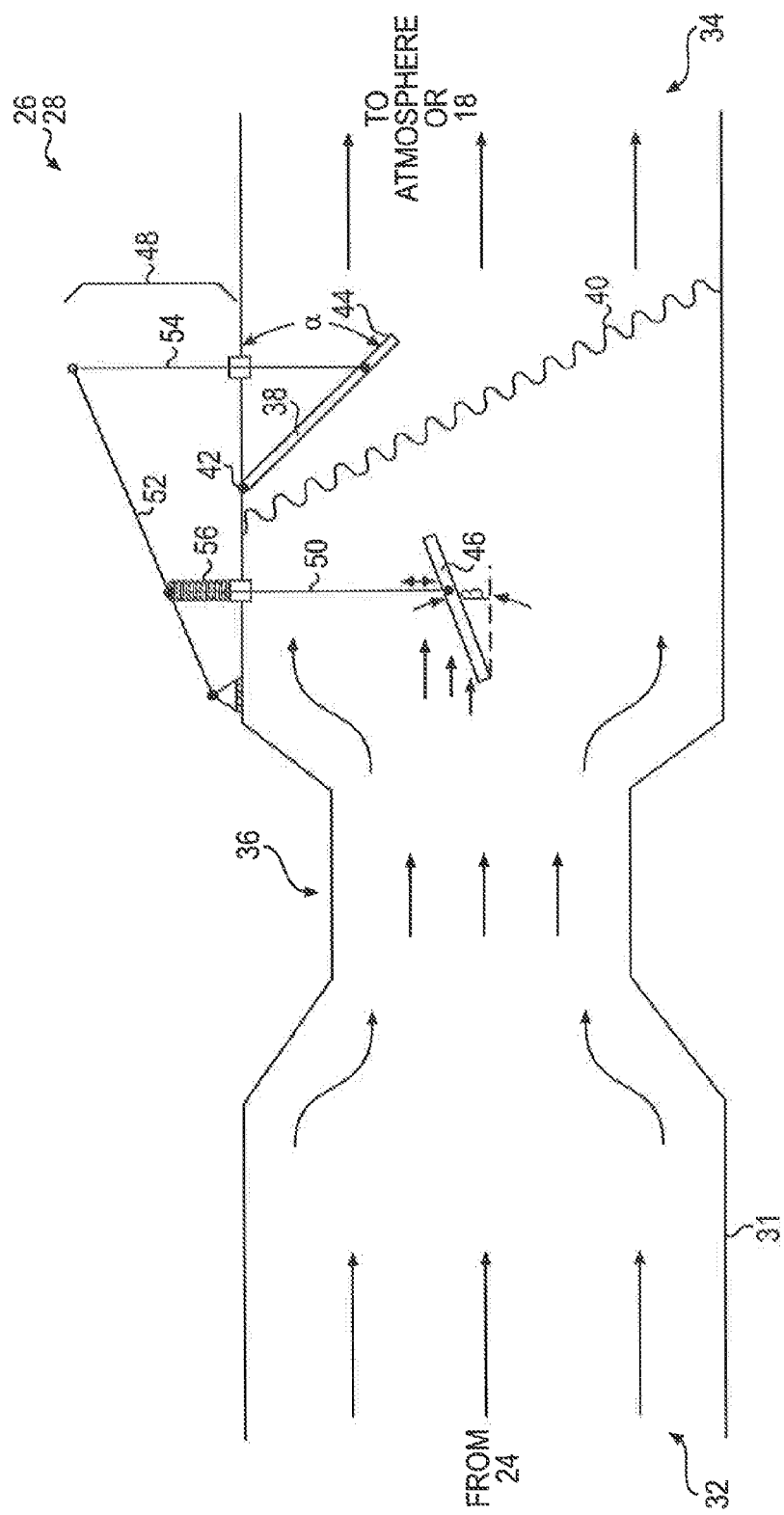
FIG. 2 is a diagrammatic illustration of an exemplary disclosed pressure reducing device that may be used in conjunction with the fuel system of FIG. 1.

FIG. 2 illustrates an exemplary embodiment of a pressure reducing device (e.g., of regulator 28). In this embodiment, the pressure reducing device includes a body 31 having an inlet 32 and an outlet 34. A converging-diverging nozzle ("nozzle") 36 may be formed between inlet 32 and outlet 34, and configured to increase a velocity of gaseous fuel received at inlet 32 to supersonic speeds. The gaseous flow, being accelerated to supersonic speeds, may impinge a shockwave inducing element (e.g., a ramp 38) located downstream of nozzle 36. When this occurs, the impinging gaseous fuel may rebound at an oblique angle off of ramp 38, creating a shockwave 40 that propagates across the flow of gaseous fuel. Shockwave 40 may result in a pressure drop at outlet 34, without a significant temperature drop. In most instances, the temperature of the gaseous fuel may actually increase at outlet 34.

The angle of incidence α of the gaseous fuel with ramp 38 may be adjusted (e.g., between about 0-45°), to thereby adjust an angle of the resulting shockwave 40 and a corresponding pressure and temperature of gaseous fuel at outlet 34. In the disclosed embodiment, ramp 38 may be pivotally connected at a first end 42 to an internal wall of body 31. And as a second end 44 of ramp 38 is raised or lowered, ramp 38 may be caused to pivot about first end 42 to a different angle. In the disclosed embodiment, first end 42 is located upstream of second end 44, although other configurations may also be possible.

An airfoil 46 may be located upstream of ramp 38, and connected via linkage 48 to second end 44. In the disclosed embodiment, airfoil 46 may be rigidly connected to linkage 48 at a particular attack angle β (e.g., at about 0-25°) relative to a central axis of body 31. As the gaseous fuel passes through nozzle 36 and strikes an exposed face of airfoil 46, airfoil 46 may be forced downward toward a center of the flow of gaseous fuel. A greater speed and pressure of the impinging gaseous fuel may result in further movement of airfoil 46 toward the center of the flow, whereas a lower speed and pressure may result in movement away from the center of the flow. As airfoil 46 moves more toward the center of the flow, ramp 38 may be moved via linkage 48 to a steeper angle α.

Ramp 38 and airfoil 46 may be biased toward the internal wall of body 31. In the disclosed embodiment, linkage 48 consists of three segments, including a first segment 50, a second segment 52, and a third segment 54. First segment 50 may be fixedly connected at a first end to airfoil 46 and extend through the wall of body 31, while a second end of first segment 50 may be pivotally connected to a midpoint of second segment 52 outside of body 31. A first end of second segment 52 may be anchored to body 31 (e.g., to an external wall of body 31), while a second end of second segment 52 may be pivotally connected to a first end of third segment 54 outside of body 31. Third segment 54 may extend back into body 31 to pivotally connect to second end 44 of ramp 38. A spring 56 may extend between body 31 and second segment 52 at any location between the first and second ends of second segment 52, to bias airfoil 46 and ramp 38 away from the center flow of gaseous fuel through body 31. It should be noted that linkage 48 shown in FIG. 2 is only one example, and that many other ways to connect airfoil 46 to ramp 38 may be utilized. In addition, linkage 48 may be located completely inside body 31, completely outside body 31, or partway inside and partway outside, as desired. It is also contemplated that airfoil 46 could move in a direction opposite ramp 38, if desired, and/or that linkage 48 could extend into body 31 from opposing sides.

INDUSTRIAL APPLICABILITY

The disclosed fuel system and pressure reducing devices find potential application in any gas handling situation. The disclosed fuel system and pressure reducing devices may find particular application in mobile gaseous fuel handling systems, such as are found in train consist 12. The disclosed pressure reducing devices may help provide for responsive pressure control over gaseous fuel, without causing significant temperature reduction. Operation of fuel system 10 will now be described.

Referring to FIG. 1, operation of fuel system 10 may begin with the drawing of LNG from tank 20 by pump 22. The LNG drawn by pump 22 may be gasified and directed at high-pressure into accumulator 24, passed through regulator 28, and directed into engine(s) 18 via supply line 30.

Pressure regulator 28 may be configured to regulate a pressure of the gaseous fuel directed to engine(s) 18. In particular, as the gaseous fuel enters body 31 via inlet 32, the fuel may be directed into nozzle 36. As the fuel passes through nozzle 36, the converging nature of nozzle 36 may increase a pressure, a temperature, and a velocity of the fuel, such that a choked condition (i.e., a maximum possible flow rate condition) is created. And as the fuel passes out of nozzle 36 into the diverging area of body 31 where the pressure is lower, the flow of gaseous fuel may become supersonic. The supersonic gaseous fuel flow may then pass over airfoil 46, pushing airfoil 46 toward a center of the flow by an amount related to the pressure and velocity of the gaseous fuel. The movement of airfoil 46 may result in a corresponding tilting movement of ramp 38. As the gaseous fuel continues toward outlet 34, a portion of the fuel flow may impinge ramp 38 and rebound away and across the remaining flow of fuel. This rebounding flow may generate a high-density shockwave of expanding gaseous fuel within body 31. The expansion may cause the pressure to drop at outlet 34, and because of losses associated with the shockwave and sudden pressure expansion, a temperature of the gaseous fuel may increase. Vent 26 may function in a manner similar to that described above for regulator 28, with the exception of the gaseous fuel flow from outlet 34 being directed into the atmosphere.

The attack angle β may correspond to an amount of movement of ramp 38 for a given pressure and/or flowrate of gaseous fuel through nozzle 36. In particular, for a greater attack angle β, a given pressure and/or flowrate may result in greater movement of ramp 38 (and a greater resulting angle of shockwave 40). And a greater angle of shockwave 40 may result in a greater pressure drop and a greater temperature increase at outlet 34. Accordingly, the attack angle may be selected and/or selectively adjusted to provide a desired pressure drop and temperature at outlet 34.

Because the gaseous fuel exiting the pressure reducing devices may have the same or an elevated temperature compared with the entering fuel, a life of the devices may be extended. In some embodiments, the temperature of the gaseous fuel may increase by as much as four times the temperature that it entered. This may allow for less expensive materials to be used within fuel system 10.

It will be apparent to those skilled in the art that various modifications and variations can be made to the disclosed fuel system and pressure reducing devices. Other embodiments will be apparent to those skilled in the art from consideration of the specification and practice of the disclosed concepts. It is intended that the specification and examples be considered as exemplary only, with a true scope being indicated by the following claims and their equivalents

What is claimed is:

1. A pressure reducing device, comprising:
   a body defining an inlet and an outlet;
   a converging-diverging nozzle formed between the inlet and the outlet;
   a shockwave inducing element disposed within the body between the converging-diverging nozzle and the outlet; and
   an airfoil located inside the body upstream of the shockwave inducing element and connected to move the shockwave inducing element, wherein the shockwave inducing element is configured to produce an oblique shockwave within the body that creates a pressure drop and a temperature increase in a flow of fluid at the outlet.

2. The pressure reducing device of claim 1, wherein the shockwave inducing element is a ramp having a first end pivotally connected at an upstream end to a wall of the body.

3. The pressure reducing device of claim 2, wherein a greater pressure in the flow of fluid through the converging-diverging nozzle results in the ramp pivoting to a greater angle away from the wall of the body.

4. The pressure reducing device of claim 2, wherein the ramp is biased toward the wall of the body.

5. The pressure reducing device of claim 4, further including:
   linkage connecting the airfoil to a second end of the ramp opposite the first end; and
   a spring connected to the linkage to bias the ramp.

6. The pressure reducing device of claim 5, wherein the airfoil is biased toward the wall of the body by the spring, and movable toward a center axis of the body by a flow of fluid passing over the airfoil.

7. The pressure reducing device of claim 5, wherein:
   the airfoil is fixedly connected to the linkage; and
   the ramp is pivotally connected to the linkage.

8. The pressure reducing device of claim 7, wherein the linkage includes an end pivotally connected to the body.

9. The pressure reducing device of claim 8, wherein the airfoil is connected to the linkage at a location between the end and the ramp.

10. The pressure reducing device of claim 1, wherein a higher pressure at the inlet results in a steeper angle of the oblique shockwave and a greater pressure drop at the outlet.

11. A fuel system for an engine, comprising:
    a supply of liquid fuel;
    a pump configured to draw fuel from the supply;
    an accumulator located downstream of the pump and configured to store gasified fuel; and
    a pressure reducing device fluidly connected to the accumulator, the pressure reducing device including:
        a body defining an inlet and an outlet;
        a converging-diverging nozzle formed between the inlet and the outlet;
        a ramp disposed within the body between the converging-diverging nozzle and the outlet, the ramp having a first end pivotally connected to a wall of the body, and a second end;
        an airfoil located inside the body upstream of the ramp;
        linkage connecting the airfoil to the second end of the ramp; and
        a spring biasing the airfoil and the ramp toward the wall of the body.

12. The fuel system of claim 11, wherein the ramp is configured to produce an oblique shockwave within the body that creates a pressure drop and a temperature increase in a flow of gaseous fuel at the outlet.

13. The fuel system of claim 12, wherein a higher pressure at the inlet results in a steeper angle of the oblique shockwave and a greater pressure drop at the outlet.

14. The fuel system of claim 11, wherein the pressure reducing device is a vent connected to the accumulator.

15. The fuel system of claim 11, wherein the pressure reducing device is a regulator connected between the accumulator and the engine.

16. A method of regulating gaseous fuel pressures for an engine, comprising:
    directing gaseous fuel through a converging-diverging nozzle; and
    generating an oblique shockwave in the gaseous fuel at a location downstream of the converging-diverging nozzle to cause a pressure drop in the gaseous fuel, wherein generating the oblique shockwave includes directing the gaseous fuel from the converging-diverging nozzle against a ramp extending out into a flow of the gaseous fuel.

17. The method of claim 16, further including adjusting an attack angle of an airfoil to vary the pressure drop.

18. The method of claim 16, further including directing the gaseous fuel from the converging-diverging nozzle over an airfoil at a location upstream of the ramp to vary an angle of the ramp and the oblique shockwave.

* * * * *